United States Patent [19]

Tolton

[11] Patent Number: 5,183,619
[45] Date of Patent: Feb. 2, 1993

[54] PROCESS FOR FORMING FIBERGLASS ARTICLES

[76] Inventor: Robert J. Tolton, 2405 N. 2300 E., Layton, Utah 84040

[21] Appl. No.: 698,008

[22] Filed: May 9, 1991

[51] Int. Cl.⁵ ............................................. B28B 7/30
[52] U.S. Cl. ................................. 264/257; 141/114; 141/319; 141/366; 264/258; 264/313; 264/316; 264/102; 425/405.1
[58] Field of Search .............. 264/102, 313, 316, 511, 264/257, 258; 425/405.1; 156/285, 287; 141/114, 319, 320, 363, 366

[56] References Cited

U.S. PATENT DOCUMENTS

| | | | |
|---|---|---|---|
| 2,913,036 | 11/1959 | Smith | 154/1.6 |
| 3,309,450 | 7/1962 | Rodgers | 264/257 |
| 3,575,756 | 10/1968 | Maus | 156/103 |
| 4,132,755 | 2/1979 | Johnson | 425/405.1 |
| 4,311,661 | 1/1982 | Palmer | 264/510 |
| 4,312,829 | 1/1982 | Fourcher | 264/313 |
| 4,732,415 | 3/1988 | Matin et al. | 425/388 |
| 4,816,106 | 3/1989 | Turris et al. | 156/285 |
| 4,902,215 | 2/1990 | Seemann | 425/405.1 |
| 4,942,013 | 7/1990 | Palmer et al. | 264/511 |

FOREIGN PATENT DOCUMENTS

| | | | |
|---|---|---|---|
| 60-83826 | 5/1985 | Japan | 264/101 |
| 944955 | 12/1963 | United Kingdom | 264/258 |

Primary Examiner—David A. Simmons
Assistant Examiner—William J. Matney, Jr.
Attorney, Agent, or Firm—Stanton E. Collier; Donald J. Singer

[57] ABSTRACT

A process of applying catalyzed resin through a vacuum bag onto a dry hand lay-up uses at least one resin reservoir with a valve nozzle thereon. The valve nozzle is placed between the lay-up and the vacuum bag. By lifting the resin reservoir connected to the valve nozzle, the catalyzed resin placed in the reservoir will be sucked by vacuum onto the laminate. The lowering of the resin reservoir stops the flow. The vacuum bag between the valve nozzle and the reservoir connector must be broken first to allow an open channel to the valve nozzle outlet.

12 Claims, 2 Drawing Sheets

PROCESS FOR FORMING FIBERGLASS ARTICLES

STATEMENT OF GOVERNMENT INTEREST

The invention described herein may be manufactured and used by or for the Government for governmental purposes without the payment of any royalty thereon.

BACKGROUND OF THE INVENTION

The present invention is related to plastic articles, and, particularly, to a process of forming fiberglass articles, and, more particularly, to a process of forming the articles wherein the different layers are hand laid-up dry and the resin is placed therein from a reservoir(s) which is positioned as desired communicating through a vacuum bag.

A single rigid mold has a springy, compressible, fibrous reinforcing material, for example, placed over a prepared surface of the rigid mold part and then a relatively thin, flexible, elastic bag or envelope is sealed to the lower margins of the rigid mold. When the air is evacuated at the top, for example, from between the mold and the vacuum bag, the bag collapses against the fibrous reinforcement and forces it to follow the contours of the rigid mold. Thus it compresses the fibrous reinforcement to the minimum thickness against the surface of the mold and prevents the fibers from being displaced or washed away by the flow of the resin. Furthermore, only sufficient resin will remain in the reinforcing mat or web to adequately wet and bond the fibers and fill the voids. Under external atmospheric pressure (when the vacuum is applied internally), the bag acts as a large fluid press distributing the pressure over the entire surface of material on the mold.

The amount of resin and rate of flow through the fibrous reinforcement can be controlled by the manipulation of the vacuum. Desirably the plastic bag is transparent so that the flow of resin may be observed during the casting process.

If the article is large, the drawing of the resin up through the matrix space and through the fibrous reinforcement material causes the filaments of the fibrous material to wash or flow with the resin and as the distance of flow increases, they eventually form dams and block the flow of resin at various points. Non-homogeneous articles are thus produced.

In order to prevent such from happening, a network of veins for resin flow may be placed over the fibrous material to insure uniform filling. U.S. Pat. No. 2,913,036 is incorporated by reference.

The use of such a network adds complexity to the process and leaves possibly unwanted protrusions in the article surface where the veins are located.

For smaller articles, hand wet lay-up may be used. In this process, the catalyzed resin is firstly painted onto the mold. Then one layer of cloth (or mat) is then placed on the wet surface and it is also painted with resin. Each layer of cloth must be carefully laid on and worked to get out as many wrinkles as is possible to achieve a uniform thickness. Each layer must be saturated before the next layer is added to avoid air pockets. This process continues for as many layers as are necessary to achieve the overall desired thickness.

Excess resin must remain to allow for squeegeeing out air pockets. Thus the thickness required directly increases the time necessary for this portion of the lay-up. When all of the laminations are on and saturated with resin, a plastic bag must be sealed over them and hooked to a vacuum system. This pulls the bag tight against the wet laminations and mold. The air and excess resin can then be squeegeed out. The thicker the article's walls, the more difficult this step becomes. On larger or more complex articles this phase also requires the use of two or more journeyman level mechanics to keep a positive pace to meet gel-time requirements. If the process to this point takes longer than the gel-time, the article fails and the time and materials are wasted.

The hand wet lay-up further exposes the workers to toxic fumes and liquids and is stress prone because of the need to finish before the gel-time.

Thus there is a need for a process for non-wet hand lay-up to overcome the disadvantages of the above processes.

SUMMARY OF THE INVENTION

The process of the present invention is a process of non-wet hand lay-up of the different layers on the mold with a vacuum bag placed thereon and selectively placed thereon controllable resin reservoirs attached to the bag.

In the process of the present invention, a mold of an article is placed on a mold tool or other flat surface. The desired conventional material such as fiberglass mat and cloth are cut as desired and fitted over the mold. A parting material is applied between the mold and the material to assist in the separation. After the laminations are placed on the mold, all wrinkles, folds, etc. are removed. After this, a valve nozzle, if only one is required, is placed on top of the laminations where desired after which a vacuum bag is placed over the mold with the nozzle thereunder. A tube connector with a resin reservoir thereon is attached to the nozzle with the vacuum bag therebetween. The vacuum bag is attached to the mold tool having a vacuum line and bleeder line therein. A vacuum is then applied and the laminations are readjusted if necessary if they were disturbed. A blocking section of the vacuum bag inside the nozzle and tube connector is punctured to allow the vacuum to reach the resin reservoir. When ready, the resin is loaded into the resin reservoir and the nozzle is elevated to allow the resin to be vacuum sucked into the laminations. Since the laminations are under vacuum, the resin flows into all the voids leaving no pockets or excess resin between the laminations. If the mold is large, the resin may be squeegeed and also other resin reservoirs may be attached as noted above.

It is therefore one object of the present invention to provide an improved process for making articles of resined laminates.

Another object of the present invention is to provide an improved process which substantially saves man-hours and reduces the number of workers required.

Another object of the present invention is to provide an improved process for making larger and thicker articles than the previous wet hand lay-up process allowed.

Another object of the present invention is to provide an improved process that greatly reduces the chance of failure of lay-up from premature resin setup.

Another object of the present invention is to provide an improved process that minimizes exposures to toxic fumes and liquids.

Another object of the present invention is to provide an improved process wherein less skilled workers may accomplish the tasks.

Another object of the present invention is to provide an improved process utilizing at least one resin reservoir selectively placed onto a vacuum bag having a controllable valve therein.

These and many other objects and advantages of the present invention will be readily apparent to one skilled in the pertinent art from the following detailed description of a preferred embodiment of the invention and the related drawings.

DESCRIPTION OF THE PREFERRED EMBODIMENT

Figure 1:
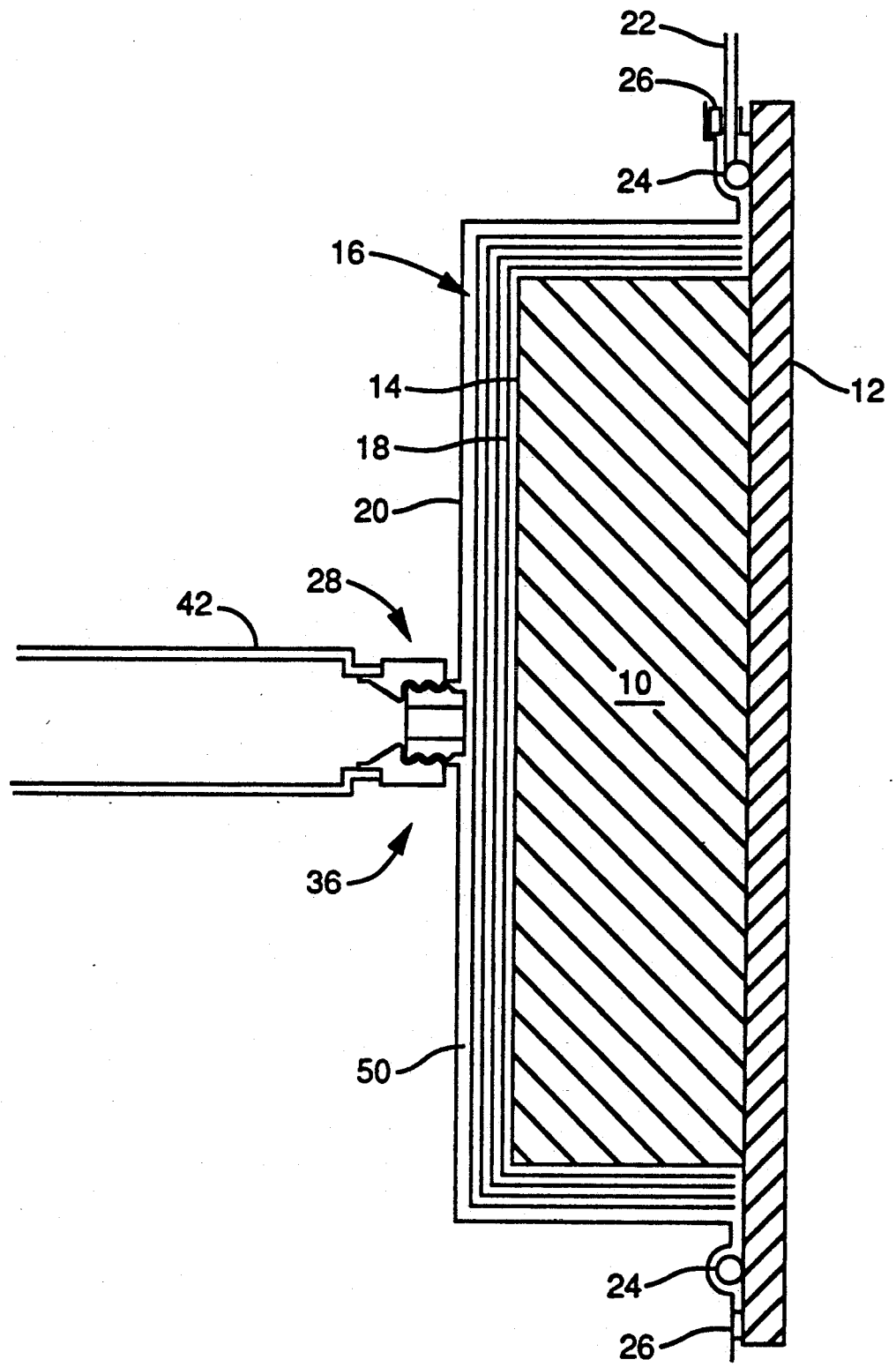
FIG. 1 illustrates by cross section the dry hand lay-up apparatus of the present invention.

Referring to FIG. 1, a mold 10 of an article in cross section is shown placed on a mold tool 12 being a table or other flat surface. The mold 10 itself may provide sufficient flat surface thereabout. The article, not shown, may be of any size where hand lay-up is practical by the present invention. An outer surface 14 of the mold 10 provides a shape on which a panel 16 having the outer shape of the mold 10 is formed.

A parting layer 18 is applied first to aid in the separation of the panel 16 from the mold 10. The panel material is applied next in a dry manner. The panel material may consist of layers of fiberglass cloth, fiberglass cloth and mat, honeycomb reinforcement, etc. U.S. Pat. Nos. 3,309,450; 3,575,756 and 4,942,013 are incorporated by reference. The panel material should have wrinkles, etc. removed as best as possible.

Figure 2:
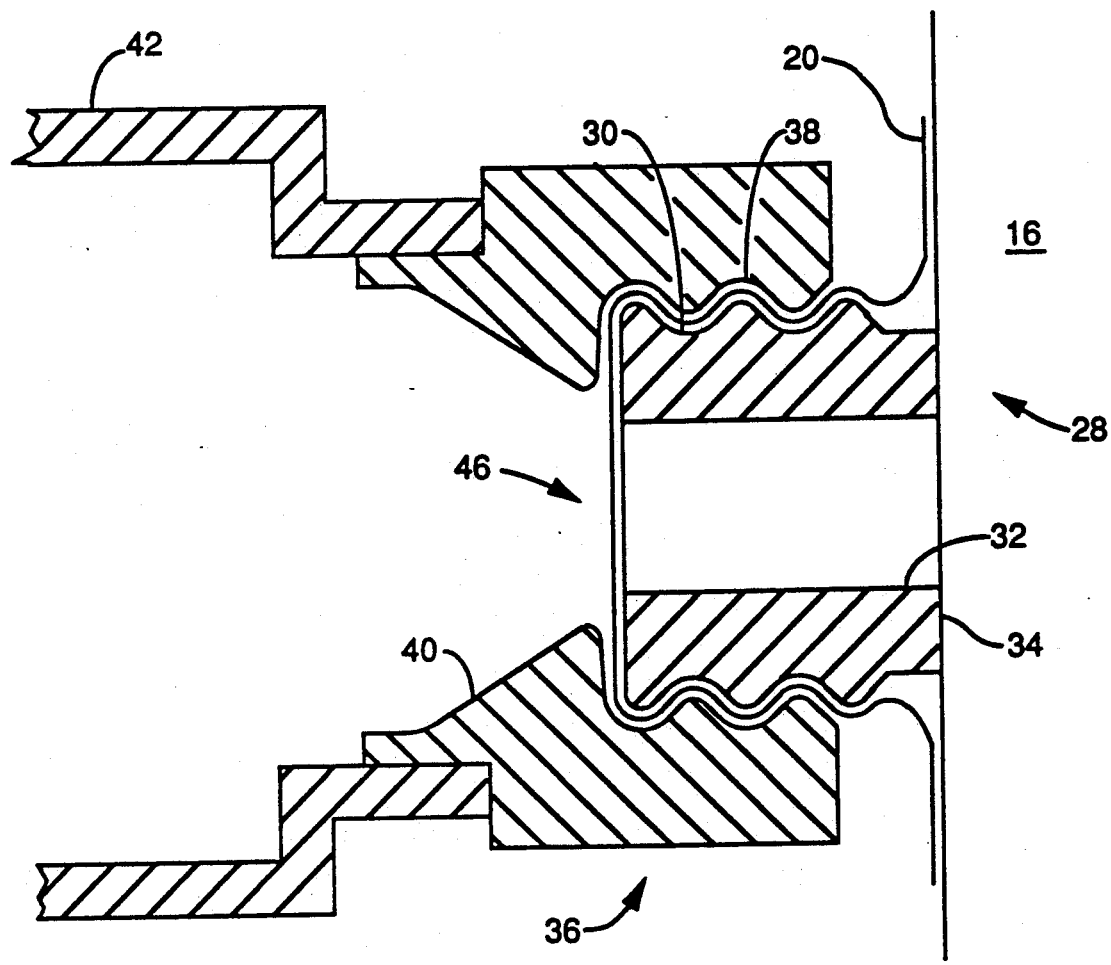
FIG. 2 illustrates an enlarged section of FIG. 1 showing the controllable valve nozzle and the tube connector with the resin reservoir thereon.

Before a vacuum bag 20 is applied, a vacuum inlet 22 and a vacuum bleeder line 24 are positioned about the mold 10. Next the vacuum bag 20 is fitted over the mold 10 and partially sealed about the mold 10 with sealing tape 26, for example. At desired locations, a valve nozzle 28 is placed by hand under the vacuum bag 20. Referring to FIG. 2, the nozzle 28 may have an outer surface 30 threaded, an inner throat 32, and a nozzle outlet 34, the bottom being flat. A reservoir tube connector 36 connects over the vacuum bag 20 onto the valve nozzle 28 by threading thereon. Other means of connecting may be used for connection such as a push-in fitting. Reservoir tube connector 36 has a threaded section 38 complimentary to the threads on the nozzle 28, a throat section 40 and a means of connecting a resin reservoir 42 to the tube connector 36 such as a ring clamp, not shown, or a press fitting. The blocking section 46 of the vacuum bag 20 is not broken at this time. The nozzle 28 and the connector 36 may be connected where needed on the mold 10. After these are connected, the vacuum bag 20 is sealed about the mold 10 on the mold tool 12 by means of the sealing tape 26.

If the mold 10 is very large, the nozzles 28 may be positioned on the panel 16 before the vacuum bag 20 is placed over the mold 10. If one does not have to hold the nozzles 28 during connection then the nozzles 28 may be placed first before the vacuum bag 20.

Thereafter, a vacuum is applied to the vacuum inlet 22 which causes the vacuum bag 20 and the nozzle 28 to press against panel 16 being a plurality of unresined laminations. Wrinkles, etc. may also be removed at this time since the dry laminations may have shifted. The blocking section 46 of the vacuum bag 20 is broken by reaching inside the reservoir 42. Resin reservoir 42 may be a solid walled container with an open top with or without a closing lid to prevent the spilling of the resin placed therein. The catalyzed resin is then poured into the resin reservoir 42.

In order to allow the resin to flow into the laminations 50, one must lift the nozzle 28 and thereafter the resin is sucked by vacuum throughout the laminations 50. No excess resin is left in the laminations because of the vacuum. Squeegeeing the resin about the panel 16 may be required. To stop the flow of resin, the nozzle 28 is lowered to touch the panel 16. The resin flow must be stopped before air is drawn into the nozzle 28.

After all the laminations are saturated with resin, the resin is allowed to cure after which the vacuum bag 20 is removed and the panel 16 removed from the mold 10. The nozzle 28 may be placed in a cutout area to be removed after curing; in an area where minor bumps are of no concern; or the bumps can be sanded off where the nozzle 28 was placed. The nozzle outlet 34 is about a half inch in diameter in the present example.

Clearly, many modifications and variations of the present invention are possible in light of the above teachings and it is therefore understood, that within the inventive scope of the inventive concept, the invention may be practiced otherwise than specifically claimed.

What is claimed is:

1. A process of applying a fluid through a vacuum bag in the, forming of a plastic article, said process comprising the steps of:
    applying at least one layer of dry laminate material onto a mold;
    positioning a vacuum path about the mold, the vacuum path including at least one bleeder line about the mold;
    placing a vacuum bag over the laminate;
    partially sealing the vacuum bag;
    inserting at least one valve nozzle between the vacuum bag and the laminate;
    attaching a tube connector with a resin reservoir thereon onto each valve nozzle;
    sealing the vacuum bag to the mold;
    applying vacuum to the vacuum path;
    opening a flow path through the valve nozzle by breaking a blocking section of the vacuum bag therein;
    putting the fluid into the reservoir;
    raising the valve nozzle to allow the fluid to be vacuum pulled into the laminate; and
    lowering the valve nozzle to stop the fluid flow.

2. A process as defined in claim 1 wherein the laminate is a fiberglass material.

3. A process as defined in claim 2 wherein said fluid is catalyzed resin.

4. A process as defined in claim 1 including a step of adding a parting layer thereon.

5. A process as defined in claim 1 further including the steps of conforming the dry laminate to the mold.

6. A process as defined in claim 3 further including steps of allowing the catalyzed resin to set; removing the vacuum; removing the vacuum bag with the valve nozzle thereon; and removing a fiberglassed laminate from the mold.

7. A process of applying a fluid through a vacuum bag, said process comprising the steps of:

applying at least one layer of dry laminate material onto a mold;

positioning a vacuum path about the mold, the vacuum path including at least one bleeder line about the mold;

placing at least one valve nozzle on the laminate;

placing a vacuum bag over the laminate and the valve nozzle;

attaching a tube connector with a resin reservoir thereon onto each valve nozzle;

sealing the vacuum bag to the mold;

applying vacuum to the vacuum path;

opening a flow path through the valve nozzle by breaking a blocking section of the vacuum bag therein;

putting the fluid into the reservoir;

raising the valve nozzle to allow the fluid to be vacuum pulled into the laminate; and lowering the nozzle to stop the fluid flow.

8. A process as defined in claim 7 wherein the laminate is a fiberglass material.

9. A process as defined in claim 8 wherein said fluid is catalyzed resin.

10. A process as defined in claim 7 including a step of adding a parting layer thereon.

11. A process as defined in claim 7 further including the steps of conforming the dry laminate to the mold.

12. A process as defined in claim 7 further including steps of allowing the catalyzed resin to set; removing the vacuum; removing the vacuum bag with the valve nozzle thereon; and removing a fiberglassed laminate from mold.

* * * * *